(12) United States Patent
Carter, Jr.

(10) Patent No.: US 6,513,752 B2
(45) Date of Patent: Feb. 4, 2003

(54) HOVERING GYRO AIRCRAFT

(75) Inventor: Jay W. Carter, Jr., Burkburnett, TX (US)

(73) Assignee: Cartercopters, L.L.C., Wichita Falls, TX (US)

( * ) Notice: Subject to any disclaimer, the term of this patent is extended or adjusted under 35 U.S.C. 154(b) by 0 days.

(21) Appl. No.: 09/862,940

(22) Filed: May 22, 2001

(65) Prior Publication Data

US 2002/0011539 A1 Jan. 31, 2002

Related U.S. Application Data

(60) Provisional application No. 60/206,021, filed on May 22, 2000.

(51) Int. Cl.[7] ............................................. B64C 27/22
(52) U.S. Cl. ............................ 244/8; 244/6; 244/17.11
(58) Field of Search ........................... 244/17.11, 7 A, 244/6, 8, 17.23, 17.19

(56) References Cited

U.S. PATENT DOCUMENTS

| | | | | |
|---|---|---|---|---|
| 2,653,778 A | * | 9/1953 | Bennett et al. | 244/17.19 |
| 3,385,537 A | * | 5/1968 | Lichten et al. | 244/17.13 |
| 5,131,603 A | | 7/1992 | Meyers | 244/17.19 |
| 5,301,900 A | * | 4/1994 | Groen et al. | 244/17.11 |
| 5,738,301 A | | 4/1998 | Francois et al. | 244/17.19 |
| 5,853,145 A | | 12/1998 | Carter, Jr. | 244/17.25 |
| 5,865,399 A | | 2/1999 | Carter, Jr. | 244/54 |
| 5,944,283 A | | 8/1999 | Carter, Jr. | 244/104 |
| 5,997,250 A | | 12/1999 | Carter, Jr. et al. | 416/27 |
| 6,077,041 A | | 1/2000 | Carter, Jr. | 416/169 |
| 6,024,325 A | | 2/2000 | Carter, Jr. | 244/17.25 |
| 6,086,016 A | * | 7/2000 | Meek | 244/17.11 |
| 6,155,784 A | | 12/2000 | Carter, Jr. | 416/134 |

FOREIGN PATENT DOCUMENTS

| | | |
|---|---|---|
| GB | 613715 | 12/1948 |
| GB | 673870 | 6/1952 |
| GB | 895590 | 5/1962 |

* cited by examiner

Primary Examiner—Peter M. Poon
Assistant Examiner—Timothy D. Collins
(74) Attorney, Agent, or Firm—Bracewell & Patterson, L.L.P.

(57) ABSTRACT

A fixed wing rotorcraft uses differential thrust between wing mounted propellers to provide counter torque when the rotor is being powered by a power source. The rotorcraft is comprised of a fuselage to which fixed wings are attached. A rotor is attached on an upper side of the fuselage and provides lift at low speeds while the wings provide a majority of the lift at high speeds. When at high speeds the rotor may be slowed to reduce advancing tip speed and retreating blade stall. Forward thrust and counter torque is provided by propellers mounted on either side of the fuselage or even on the wings.

14 Claims, 4 Drawing Sheets

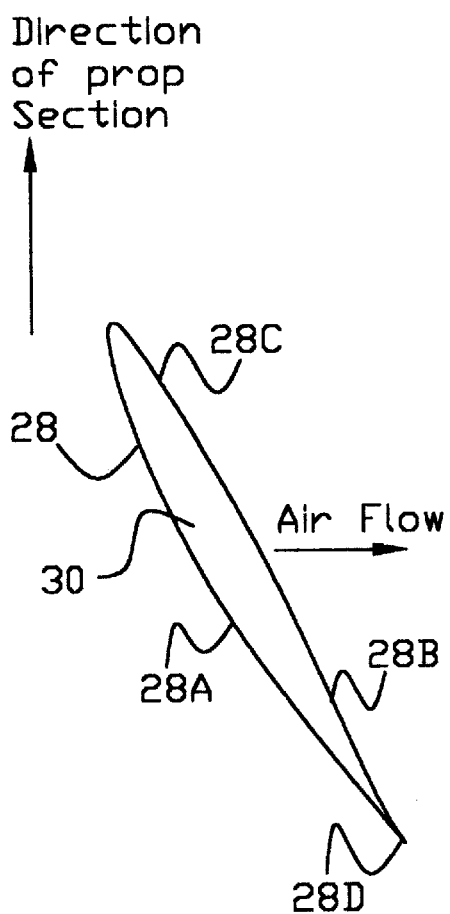
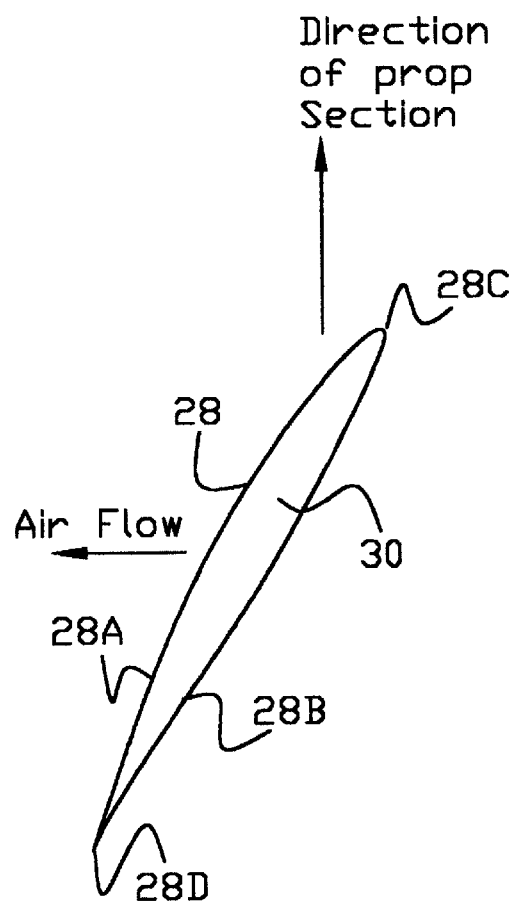
Fig. 4
Fig. 5

HOVERING GYRO AIRCRAFT

This application claims the benefit of U.S. Provisional application Ser. No. 60/206,021, filed May 22, 2000.

BACKGROUND OF THE INVENTION

1. Field of Invention

This invention relates in general to a gyro-type aircraft, and more specifically to gyro type aircraft that have the ability to hover.

2. Description of the Related Art

Air transport of cargo is typically handled by either large airplanes or large helicopters. Large airplanes have an advantage of being much faster than helicopters, but the disadvantage of requiring long runways. Large helicopters have the advantage of vertical take offhand landing but are not as fast as airplanes. Another advantage of helicopters is the ability to hover, or maintain a relatively static position over a location on the surface below. This feature is useful in many situations including rescue operations over water and unstable surfaces.

One vehicle that can achieve relatively high speeds and achieve vertical take off and landings is the gyroplane, as described in U.S. Pat. No. 5,727,754. The gyroplane uses pre-rotation of a weighted rotor to achieve vertical take off without the need for a tail rotor. The rotor is not powered once the gyroplane leaves the ground. The craft flies in a manner similar to auto-gyros, except that at high speeds the rotor may be unloaded as the wings begin to create sufficient lift. This allows the rotor to slow and reduces advancing tip speed, which is the major limiting factor in highspeed rotor craft. In it's current state of development the pre-rotation method of vertical take off possess some technical problems for lifting large payloads. Also, the gyroplane cannot hover.

It would be advantageous to have a cargo craft capable of traveling at higher speeds than a helicopter, but also able to achieve vertical take off and landing and hovering.

BRIEF DESCRIPTION OF DRAWINGS

FIG. 4 is a sectional view of the propeller of the aircraft in FIG. 1 in normal forward flight mode.

FIG. 5 is a sectional view of the propeller of the aircraft in FIG. 1 in reverse flow mode.

SUMMARY OF THE INVENTION

The aircraft of this invention has a fuselage with wings attached to opposite sides of the fuselage for providing lift during forward flight. A rotor mounts to the upper side of the fuselage for vertical take-off and for hovering. A forward propulsion assembly applies forward thrust to the aircraft. A power source is coupled to the forward propulsion assembly and the rotor for supplying power. A torque countering means counters torque produced by the rotor while the rotor is being driven by the power source. Preferably, the torque is handled by counter-rotating propellers, each mounted on opposite sides of the fuselage. The pitch is controlled on the propellers to offset torque produced by the rotor. The propellers also serve as the forward propulsion assembly.

A clutch is preferably connected between the power source and the rotor to allow the rotor to be disengaged from the power source for auto-rotation during forward flight. The clutch also allows the rotor to free-wheel rotate at a speed higher than the speed of the rotation of the output shaft of the power source during inertia takeoff.

DESCRIPTION OF THE PREFERRED EMBODIMENT

Figure 1:
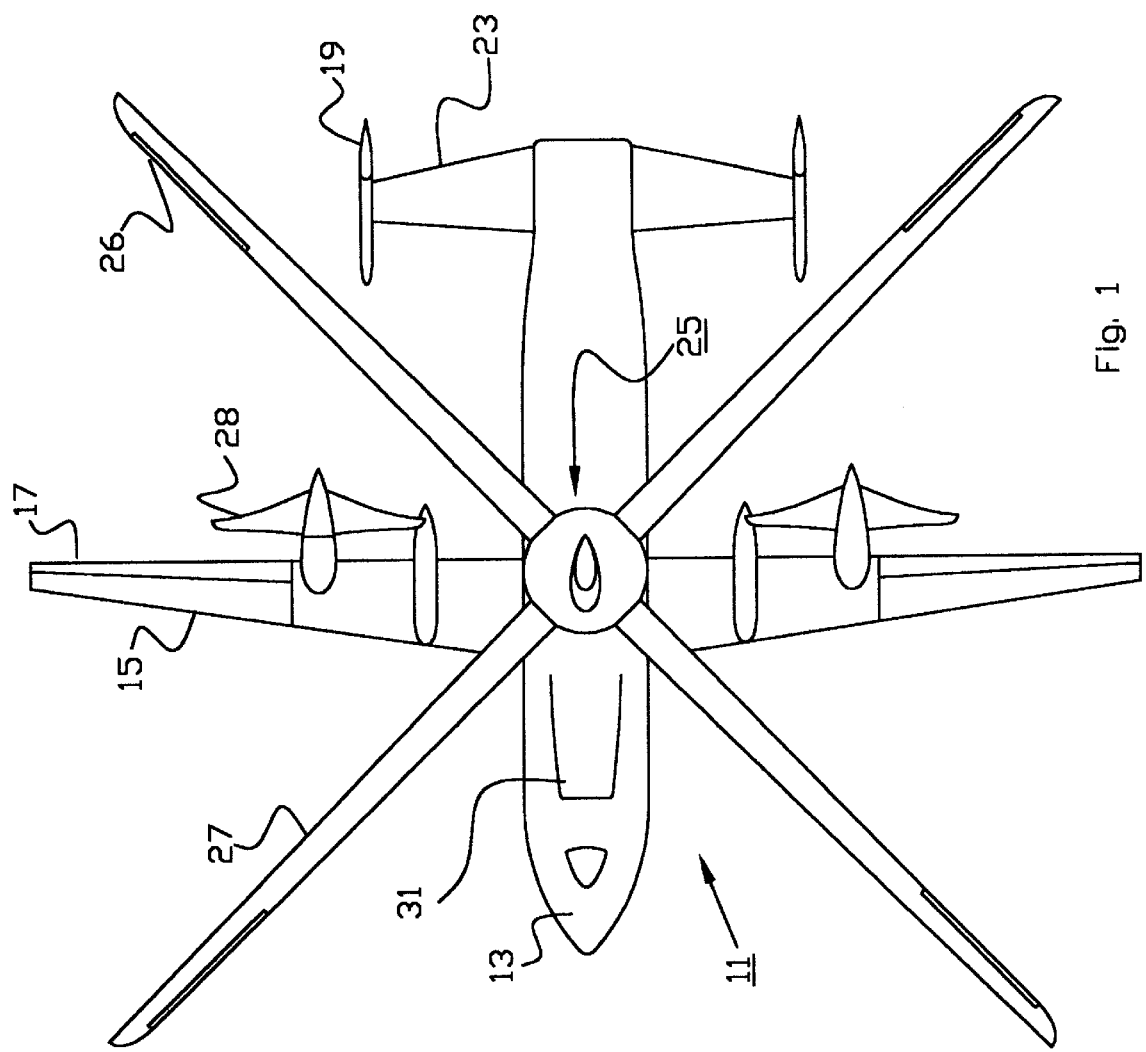
FIG. 1 is a top view of an aircraft constructed in accordance with this invention.

Referring to FIG. 1, aircraft 11 has an elongated fuselage 13. A pair of high aspect ratio wings 15 extend outward from fuselage 13. The length of each wing 15 over the chord between the leading edge and trailing edge is quite high so as to provide efficient flight at high altitudes. Wings 15 preferably have ailerons 17 that extend from the tip to more than half the distance to fuselage 13. Each aileron 17 has a width that is about one-third the chord length of wing 15 and is moveable from a level position to a full 90 degrees relative to the fixed portion of each wing 15.

Figure 3:
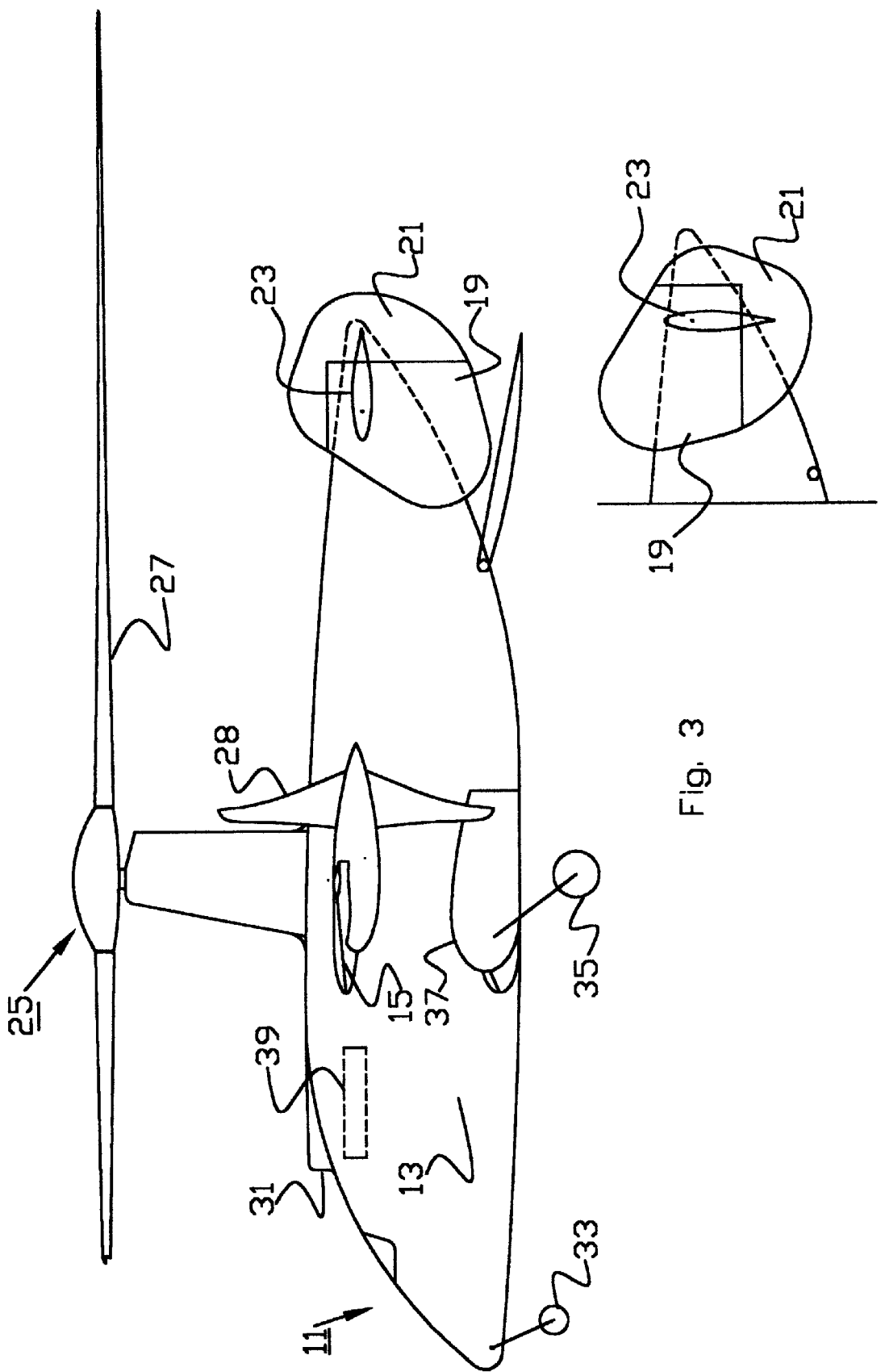
FIG. 3 is a side elevational view of the aircraft of FIG. 1.

Aircraft 11 also has a pair of vertical stabilizers 19, each of which has a moveable rudder 21 (FIG. 3). Each vertical stabilizer 19 is mounted at the aft end of fuselage 13 on a horizontal airfoil and structural member that is referred to herein as a stabilator 23.

Stabilator 23 is also pivotal from a level position in a plane parallel with wings 15 to a 90 degree downward position relative to the level position. Vertical stabilizers 19, being attached to horizontal stabilizer 23, rotate downward in unison with stabilator 23.

A rotor 25 extends upward from fuselage 13 and supports at least one pair of blades 27 and preferably two pairs as shown in FIG. 1. Rotor 25 is tiltable in forward and rearward directions relative to fuselage 13. Blades 27 are weighted at their ends by heavy weights 26 for increasing stiffness at high rotational speeds and creating inertia. Blades 27 may be constructed generally as shown in U.S. Pat. No. 6,024,325, issued Feb. 15, 2000, all of which material is hereby incorporated by reference. Each blade 27 comprises a shell or body that encloses a longitudinal twistable carbon spar (not shown). The spar is continuous through the body and attaches to the body at approximately 40 percent of its radius. Each blade 27 is pivotal to various pitches about a centerline extending from rotor 25.

A pair of propellers 28 are mounted to fuselage 13 by a horizontal strut 29. One propeller 28 is located on each side of fuselage 13. In the preferred embodiment, propellers 28 are pusher type, facing aft. Each propeller 28 may be constructed generally as shown in U.S. Pat. No. 6155784 issued Dec. 5, 2000, all of which material is hereby incorporated by reference. Each propeller 28 has a continuous carbon spar (not shown) that runs from blade tip to blade tip. Each carbon spar is twistable inside a blade body 30 (FIGS. 4 and 5), so that the blade pitch can vary.

Referring to FIGS. 4 and 5, each propeller 28 has a convex, curved, low pressure side 28a, and a high pressure side 28b, which in the preferred embodiment is flat. Each blade of propeller 28 has a leading edge 28c and a trailing edge 28d. During a normal forward flight mode, as shown in FIG. 4, leading edge 28c is forward of trailing edge 28d. Rotation of propeller 28 while at this pitch causes air flow to the right, as shown in the drawing. Since it is arranged as a pusher propeller, the flight direction would be to the left for normal flight. When the pitch is changed to reverse flow, as shown in FIG. 5, leading edge 28c is now tilted aft of trailing edge 28d. This results in airflow to the left.

Figure 2:
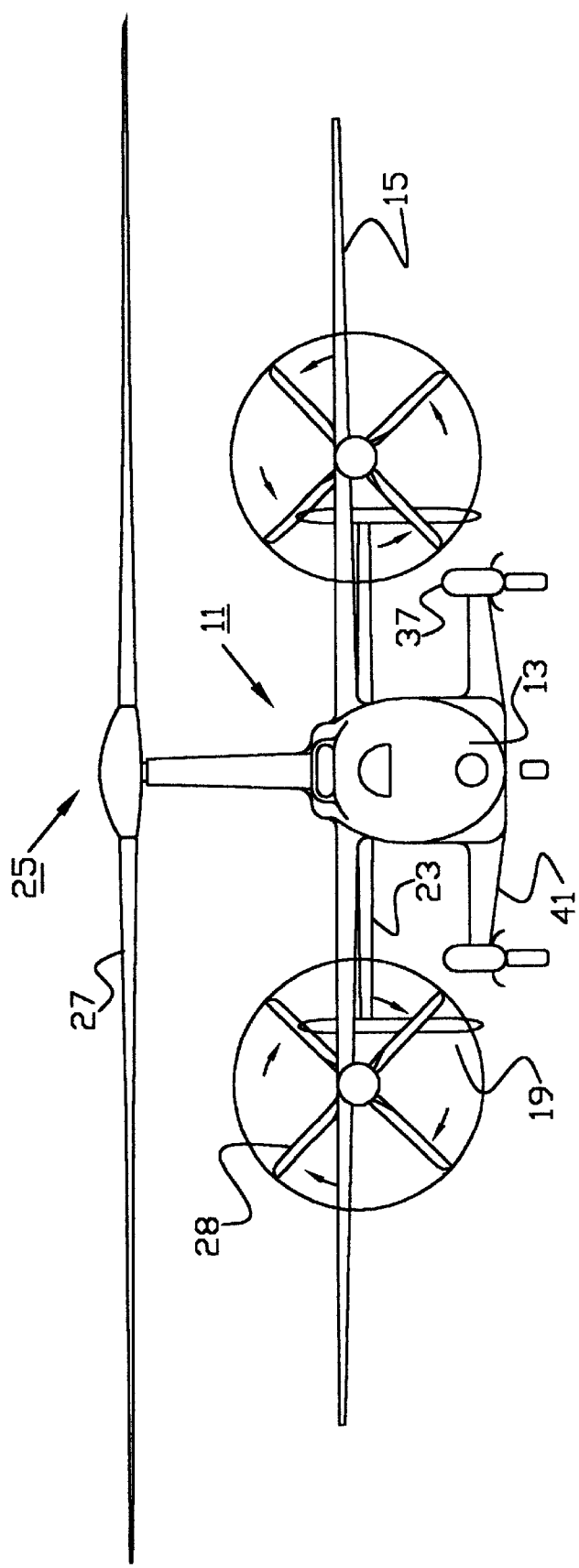
FIG. 2 is a front elevational view of the aircraft of FIG. 1.

Since propeller 28 is a pusher type, aircraft 11 would not normally be flying in a forward direction while propeller 28 is pitched as shown in FIG. 5. Rather, the reversibility of the pitch enables propellers 28 to be utilized to counter rotational torque produced by rotor blades 27 when they are driven during flight. Propellers 28 always rotate counter to each other, as shown in FIG. 2. However, when rotational torque of rotor 25 is to be countered, one propeller 28 is pitched for reverse thrust, as shown in FIG. 5, while the other is pitched for forward thrust, as shown in FIG. 4. The degree of pitch differs, and the difference between the two pitches will provide a counter torque that is controlled to equal rotational torque produced by rotor 25.

FIG. 1 illustrates schematically a power source 31 that preferably comprises multiple gas turbine engines located within fuselage 13 and connected by drive shafts (not shown) to propellers 28 and rotor 25. Power source 31 includes a two-speed gear box or automatic transmission incorporated in the drive train leading to propellers 28. One gear ratio results in propellers 28 rotating at a low speed relative to engine rpm for high altitude cruising flight and other instances that will be explained below. Another gear ratio rotates propellers 28 at a higher speed relative to the engine speed for takeoff and lower velocity flight.

Power source 31 also includes a clutch in the drive train leading to rotor 25. The clutch is of an overrunning type that will allow rotor 25 to spin at higher revolutions than the drive shaft driven by the engines, but when the rotor speed drops to a certain level, it begins again to be driven by the engine. The clutch also can be actuated to completely disengage rotor 25 from being driven by power source 31. The various modes will be described below in the operational description.

Referring to FIG. 3, aircraft 11 has a nose gear 33 and a set of main landing gear 35. Preferably, landing gears 33, 35 are of a type that will absorb high impact loads that may occur during hard landings, such as described in U.S. Pat. No. 5,944,283, issued Aug. 31, 1999, all of which material is hereby incorporated by reference. The landing gears 33, 35 are retractable. Main landing gear 35 retracts into a fairing 37 located partially above wings 15.

Aircraft 11 has a controller 39 that controls propellers 28. Controller 39 includes a computer that continuously monitors horsepower, engine rpm, true air speed, temperature and thrust, and controls the rpm of propellers 28 by varying the pitch to maintain the best engine/propeller efficiency from static conditions to maximum cruise for any given altitude.

Controller 39 also controls the two-speed propeller transmission of power source 31. It changes the drive ratio automatically when the rpm of propellers 28 need s to be slowed to maintain the best efficiency. This ratio change also allows engine 31 to continue to run at high rpms so more horsepower and better efficiencies are obtained at the higher cruise altitudes and speeds.

Aircraft 11 can perform inertia assisted jump takeoff as well as a conventional hover takeoff. Furthermore, it can perform a longer runway takeoff, if desired. The inertia boosted takeoffs are particularly appropriate when the density altitude is high and aircraft 11 is at a gross weight. For an inertia assisted takeoff, the pilot increases the speed of the gas turbine engines to an rpm that is faster than its normal cruise speed. To avoid the propellers 28 from over speeding while this occurs, controller 39 shifts the transmission to cause propellers 28 to rotate at the low speed ratio relative to the speed of the engine. Rotor 25 is driven by engines 31 to a high rotational speed, which may be between 125 and 130 rpm for a large diameter rotor. Both propellers 28 will be at the same pitch so that thrust tends to push the aircraft 11 forward. The pilot can keep the forward movement from occurring by keeping the brakes on while rotor 25 reaches the maximum speed. Torque due to rotor 25 being driven does not need to be countered because the landing gear 33, 35 is still supporting aircraft 11 on the ground. To reduce downwash on the airfoils due to the spinning blades 27, ailerons 17 and stabilator 23 will be pivoted 90 degrees downward After rotor 25 reaches its maximum overspeed, the pilot reduces the rpm speed of the engines to a normal rpm. At the same time, the automatic transmission for propellers 28 changes the speed of the propellers 28 to the high speed ratio to provide optimum rpm for static thrust. Because of weights 26, rotor blades 27 continue to spin at a high speed, faster than the speed of the drive shaft driven by the engine. The override clutch, which is part of power source 31, enables rotor blades 27 to spin at a higher speed than the engine rpm.

The pilot then changes the pitch on rotor blades 27, referred to as collective, and releases the brakes. Aircraft 11 will begin to move forward and lift simultaneously due to the combined effects of the static thrust from propellers 28 and the rotor 25. At this point rotor 25 will still be rotating faster than the engine drive because of inertia. Since it is not being driven by the drive shaft, rotor 25 will produce no torque on fuselage 13 at this point. Acceleration up to about 50 mph preferably occurs in less than 5 seconds. By this time, rotor 25 rpm will have slowed to its hover speed, preferably around 96 rpm and the override clutch automatically engages rotor 25, enabling the power source 31 to again drive rotor 25. A portion of the horsepower of power source 31 will be driving rotor 25 while another portion continues to drive the twin propellers 28. Because of the forward speed, no counter to rotational torque of rotor 25 is required at this point.

The pilot begins to reduce rotor collective pitch as forward speed increases. This allows aircraft 11 to accelerate to a more efficient condition for climb and keeps rotor blades 27 flapping within desired limits. This action also reduces the horsepower and torque going to rotor 25. At a certain point, such as around 100 mph, the collective pitch on rotor 25 has been reduced and the pilot has tilted rotor 25 backward to a point where the rotor 25 is in full auto-rotation. During auto-rotation, rotor 25 is being driven by the air flowing through blades 27 due to forward movement of aircraft 11 and no longer requires power source 31 to drive rotor 25. Preferably, the clutch now completely disengages rotor 25 from power source 31. The two propellers 28 cause aircraft 11 to continue to accelerate. As aircraft 11 accelerates, the pilot continues to reduce collective rotor pitch because the wings 15 will be producing more lift. The pilot will preferably maintain a shallow climb so that aircraft 11 will continue to accelerate to a better climb speed. This requires the pilot to tilt rotor 25 forward to maintain lift equilibrium. This reduces the air flowing up through the blades 27 of rotor 25, lets the rotor speed slow down, and further reduces rotor lift, transferring additional weight to wings 15.

At around 150 mph, the collective pitch of rotor blades 27 will be at minimum. Ailerons 17 and stabilator 23 are back to their normal positions for forward flight. At around 200 mph, the high aspect ratio wings 15 now support more than 75 percent of the weight of aircraft 11. The rotor 25 speed is even slower, around 40 rpm, and produces less than 25 percent of the lift. This reduces the drag on rotor blades 27.

At around 250 mph, the automatic transmission of engine power source 31 changes to the low speed ratio to reduce the speed of propellers 28 relative to the engine speed. Reducing the tip speed of propellers 28 keeps the efficiency of propellers 28 at peak levels. At the same time, it allows the engine from power source 31 to continue turning at a high rpm, which allows the gas turbine engines to produce their maximum horsepower at higher altitudes. The result is that aircraft speed and flight efficiency are significantly improved. At 400 mph, the engine speed, range and flight efficiency increase dramatically once reaching a high enough altitude, such as 30,000 feet. The high aspect ratio of wings 15 allows aircraft 11 to fly very efficiently. Rotor blades 27 slow to a minimum speed of about 25 rpm, further reducing the drag on rotor blades 27.

Landing is preferably at a very steep angle and occurs in reverse order to the takeoff described above. While landing, rotor 25 is tilted aft and the collective pitch of rotor blades 27 is increased as necessary to control the rotor rpm. Air flow through rotor blades 27 will cause rotor blades 27 to speed up in rpm. The collective pitch is increased to slow the sink rate and provide for a soft landing. The clutch of power source 31 will be engaged to drive rotor 25 if it drops below the engine rpm speed. Ailerons 17 and stabilator 23 are pivoted downward. The lift produced by rotor 25 during the landing acts as a brake to slow aircraft 11 speed.

For a hover type takeoff, rotor 25 will be driven at all times and will not be operated in the overspeed mode. The high speed gear ratio for propellers 28 is utilized from the beginning. Controller 39 shifts the pitch of one propeller 28 for forward thrust and the other propeller 28 for rearward thrust so as to counter torque produced by rotor 25. The net thrust produced by propellers 28 is adjusted to equal the torque produced by rotor 25. The pilot increases the collective pitch on rotor blades 27, which causes the aircraft 11 to lift vertically. Propellers 28 continue to produce thrust in opposite directions, producing a torque that equals the torque on rotor 25. The torque and thrust will continuously be monitored and the pitches on propellers 28 varied to balance the counter torque to that of the torque produced by rotor blades 27. The pilot can continue to hover. Rudder 21 can be manipulated to provided fine yaw control if needed.

When the pilot wishes to accelerate forward, he pushes a thumb slide switch mounted on the control stick that instructs controller 39 to now provide forward thrust. The more the thumb slide switch is moved forward the more of the aircraft's excess horse power is directed toward forward thrust. The controller 39 will change the pitches so that both propellers 28 now provide more net forward thrust. At some point the torque going through the rotor drive shaft will be reduced such that both propellers can produce forward thrust. The forward motion of aircraft 11 enables the pilot to reduce collective pitch on rotor blades 27 and repeat the steps explained above in connection with the rotor inertia assisted takeoff.

The invention has significant advantages. The aircraft can take-off and land vertically and on short runways, yet still be capable of high speed flight. The aircraft can hover, as well and carry a substantial cargo.

Although the invention has been described in some of its forms, it is not thus limited but is susceptible to various changes and modification without departing from the spirit of the invention. For example, although providing a differential in the thrust of the dual propellers counters the torque provided to the rotor by the power source in the preferred embodiment, other means for countering torque are available to use with this gyro-plane type vehicle. Intermeshing rotors that rotate in opposite directions which could be adapted to be used in this invention. Also, dual rotors separated, as in the CH-47 Chinook produced in the 1960's, can also be adapted to the gyro-plane model to provide torque countering. In both vehicles the two rotors, or sets of rotors, spin in opposite directions, thereby countering the torque being provided by power source. To incorporate these other torque countering means into this invention, wings and either propellers or tubojet power sources would be added. The wings would take up the load at higher speeds and the propellers or turbojet engines would provide forward thrust at higher speeds, thus allowing the rotors to unload as described above. Also, although the preferred embodiment has two separate wings, a single wing incorporated with the fuselage would also be feasible.

I claim:

1. An aircraft comprising:
    a body having a longitudinal axis and a wing extending from opposite sides;
    a pair of adjustable pitch propellers, each said propeller positioned on one side of said longitudinal axis for rotation in opposite directions to each other;
    a rotor mounted to an upper side of said body to provide downward thrust the rotor having weighted tips;
    a power source that drives said rotor and said propellers;
    a controller for said propellers to adjust the pitch of said propellers between a forward flight mode wherein both propellers exert a forward thrust on said body and a hovering mode wherein one of said propellers exerts a rearward thrust and the other a forward thrust to counteract torque provided by said rotor when said rotor is driven by said power source and said power source comprises an engine and an overrunning clutch that is located between said engine and said rotor to enable said rotor to rotate faster than an output speed of said engine, due to the weighted tips.

2. The aircraft of claim 1 wherein:
    said wing has an aspect ratio greater than one.

3. The aircraft of claim 1 wherein:
    an aileron is attached to said wing.

4. The aircraft of claim 1 further comprising:
    a moveable rudder positioned at the rear of said body.

5. The aircraft of claim 1 further comprising:
    a moveable generally horizontal airfoil at the rear of said body.

6. The aircraft of claim 1 wherein:
    said power source comprises an engine and a multi-speed gearbox located between said engine and said propellers for rotating said propellers are at least two different speeds relative to an output shaft of said engine.

7. An aircraft comprising:
    a fuselage;
    wings attached to opposite sides of said fuselage for providing lift during forward flight;
    a rotor attached to an upper side of said fuselage;
    a power source coupled to said rotor for rotating said rotor;
    torque countering means for counteracting torque produced by said rotor while said rotor is being driven by said power source; wherein:
    said torque countering means comprises a pair of propellers, each located on an opposite side of said fuselage, said propellers being pitch adjustable from a forward thrust mode to a reverse thrust mode;
    a controller for changing the pitch of one of said propellers to the reverse thrust mode while the other of said propellers is in the forward thrust mode and an overrunning clutch connected between said power source and said rotor for selectively disengaging said rotor from said power source to allow said rotor to auto-rotate during forward flight, and also for allowing said rotor to free wheel rotate at a speed higher than a speed of rotation of an output shaft of said power source.

8. An aircraft comprising:

a fuselage having a longitudinal axis and wings extending from opposite sides;

a pair of adjustable pitch propellers, each said propeller positioned on one side of said longitudinal axis for rotation in opposite directions to each other;

a rotor mounted to an upper side of said body to provide downward thrust, said rotor having weights located at each tip;

an engine that drives said rotor and said propellers;

a controller for said propellers to adjust the pitch of said propellers between a forward flight mode wherein both propellers exert a forward thrust on said body and a hovering mode wherein one of said propellers exerts a rearward thrust and the other a forward thrust to counteract torque provided by said rotor when said rotor is driven by said power source;

an overrunning clutch that is located between said engine and said rotor to enable said rotor to rotate faster than an output speed of said engine; and a multi-speed gearbox located between said propellers and said engine for rotating said propellers at more than one speed relative to an output speed of said engine.

9. The aircraft of claim 8 wherein:

said wing has an aspect ratio greater than one.

10. The aircraft of claim 8 further comprising:

an aileron is attached to said wing.

11. The aircraft of claim 8 further comprising:

a movable horizontal airfoil positioned at a rear portion of said fuselage.

12. A method for operating an aircraft having a body, a wing extending from opposite sides of the body, and a rotor having weighted tips, comprising:

mounting a pair of propellers to said body, one each side of a longitudinal centerline of said body;

coupling said rotor to a power source via an overrunning clutch and coupling said propellers to said power source;

while on ground, rotating said rotor and said propellers with said power source;

when said rotor speed reaches a selected level, reducing the speed of said power source and of said propellers, so that said rotor rotates free of said power source due to said weighted tips and said overrunning clutch;

increasing a pitch of said rotors to create lift to elevate said aircraft above ground and causing said aircraft to move forward due to forward thrust created by said propellers;

creating lift by air flowing over said wing and causing said rotor to auto-rotate free of power from said power source; then, to hover driving said rotor with said power source and changing a pitch of said propellers individually to create a thrust differential between said propellers to counter torque provided to said rotor.

13. The method according to claim 12, wherein the step of coupling said propellers to said power source comprises connecting a multi-speed gearbox between said power source and said propellers, and causing said propellers to rotate at a higher speed relative to an output of said power source for take-off and at a lower speed relative to said output of said power source for horizontal flight.

14. The method according to claim 12, wherein the step of creating a thrust differential comprises adjusting the pitch of one of said propellers to produce forward thrust and the pitch of the other of said propellers to produce reverse thrust.

* * * * *